United States Patent [19]

Bittihn et al.

[11] 4,362,793
[45] Dec. 7, 1982

[54] GALVANIC CELL WITH SOLID ELECTROLYTE

[75] Inventors: Rainer Bittihn, Kelkheim; Armin Wagner, Laubach, both of Fed. Rep. of Germany; Jean-Paul Randin, Cortaillod; Jean-Daniel Rosselet, Fenin, both of Switzerland

[73] Assignee: Varta Batterie Aktiengesellschaft, Hanover, Fed. Rep. of Germany

[21] Appl. No.: 263,429

[22] Filed: May 14, 1981

[30] Foreign Application Priority Data

Jul. 10, 1980 [DE] Fed. Rep. of Germany ....... 3026141

[51] Int. Cl.$^3$ .............................................. H01M 6/18
[52] U.S. Cl. .................................... 429/191; 429/218
[58] Field of Search ................................. 429/191, 218

[56] References Cited

U.S. PATENT DOCUMENTS

| | | | |
|---|---|---|---|
| 3,988,164 | 10/1976 | Liang et al. | 429/191 |
| 4,139,681 | 2/1979 | Klemann | 429/191 |
| 4,258,109 | 3/1981 | Liang et al. | 429/191 |
| 4,299,890 | 11/1981 | Rea et al. | 429/191 X |

*Primary Examiner*—Charles F. LeFevour

*Attorney, Agent, or Firm*—Weiser, Stapler & Spivak

[57] ABSTRACT

A galvanic cell with solid electrolyte, which is dischargeable at room temperature and whose positive electrode consists of the metals Sb, Bi, or of the oxides or chalcogenides of these metals, or of mixtures of members of the respective groups, bases its current productive processes upon the formation of a reversible intermetallic combination between the Sb or Bi and the alkali metal of the negative electrode. The reaction equations are:

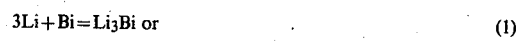

$$3Li + Bi = Li_3Bi \text{ or} \tag{1}$$

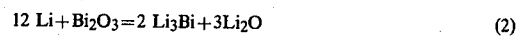

$$12\,Li + Bi_2O_3 = 2\,Li_3Bi + 3Li_2O \tag{2}$$

A cathode material according to equation (2) is particularly desirable because $Bi_2O_3$ has a higher volumetric capacity than Bi, due to the greater electron transition from $Bi^{3+}$ to $Bi^{3-}$, thereby yielding higher energy density. In both cases the discharge potential is 0.8 V. As the solid electrolyte, $Li_3N$ or $Na_3Zr_2Si_2PO_{12}$ (Nasicon) can be used.

6 Claims, 1 Drawing Figure

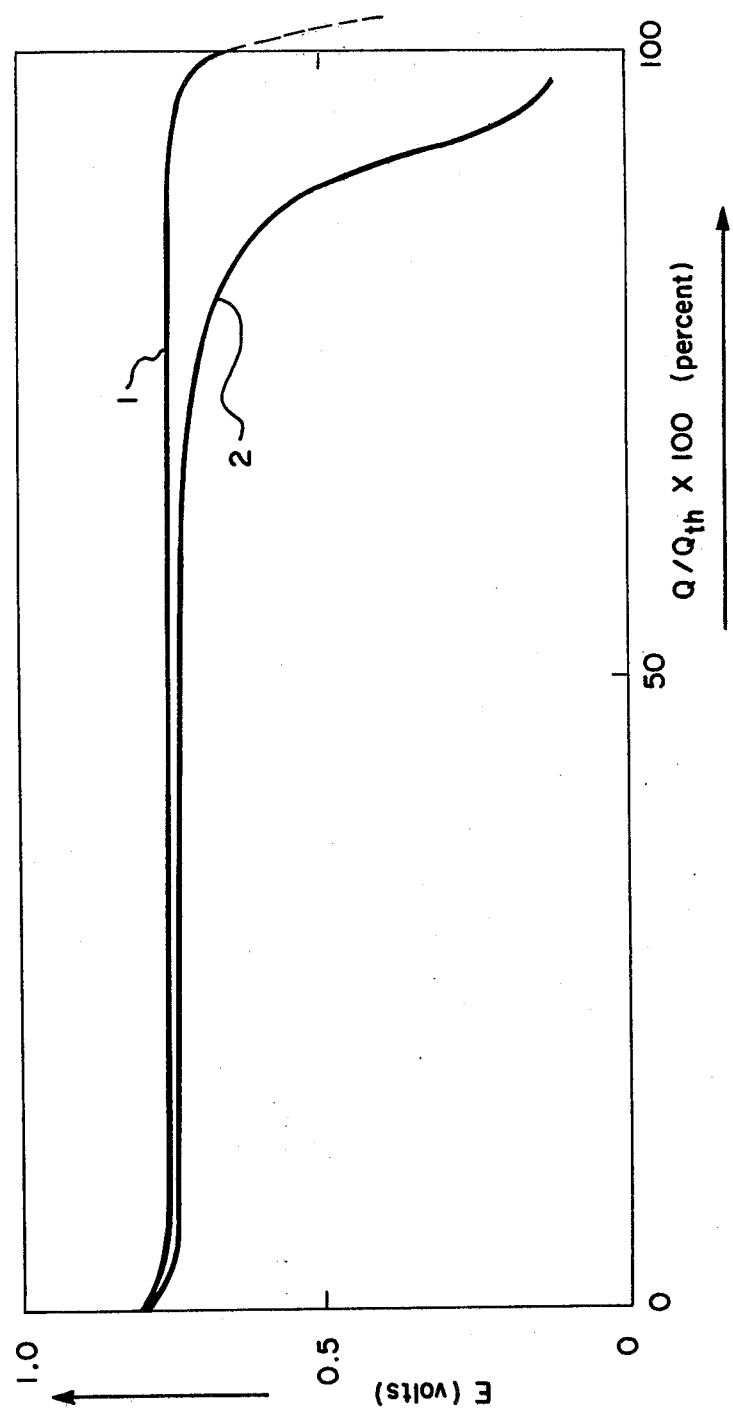

GALVANIC CELL WITH SOLID ELECTROLYTE

The invention relates to a galvanic cell with solid electrolyte, having a negative alkali metal electrode, a solid positive electrode, and a solid electrolyte between the electrodes, the cell being dischargeable at room temperature.

The performance capability of galvanic cells with solid electrolyte is inherently limited in two respects: the electrochemical exchange between the active substances is limited in its dimensions to the geometrical contact surface between one of the reactants, generally the cathode, and the solid electrolyte. In addition, the diffusion velocity in solids, especially at room temperature, is extremely low. The latter also manifests itself in a slight discharge depth.

On the other hand, substantially more favorable discharge conditions prevail when cells with negative alkali metal electrodes contain either a liquid—in this case organic—electrolyte, or when they are operated as a high-temperature solid electrolyte cell above the melting temperature of the cathode material.

In the first instance, the essential promotion of ionic conduction within the cathode is assured by its porosity. The liquid electrolyte penetrates the cathode volume and provides pronounced discharge depths, given sufficient electronic conductivity of the cathode material which may be promoted by a graphite additive, if desired.

Therefore, in principle, any material can be more or less discharged using a liquid electrolyte.

In the latter instance, for the high temperature solid electrolyte cell, the temperature is so chosen that, not only the cathode, but also the discharge product, is in the molten state. An example of this is the Na/Na$_3$Zr$_2$Si$_2$PO$_{12}$ (Nasicon)/S-cell. Here, the load capacity of the cathode is a function of the diffusion parameters and of the concentration gradient of the discharge products in the cathode. At room temperature the discharge of such a cell would be possible only to a very limited degree.

In order to obtain a solid electrolyte cell which operates at room temperature, it is possible in principle to make the cathode substance more conductive through the addition of finely divided electrolyte and to cause the mixture, when pressed into an electrode body to approach the conditions of the porous electrode. However, such a procedure presupposes that the cathode material and the solid electrolyte are compatible with each other. This requirement is not met by the otherwise preferred solid electrlyte Li$_3$N, for example, because, in its most finely particulate form, it reacts with potential cathode materials due to its low thermodynamic decomposition potential of 0.45 V, while the reaction at the electrolyte tablet/cathode tablet boundary surface is negligible.

Solid cells are known whose current production is based on the fact that the metal of the negative electrode produces intercalation compounds with the cathode material even at room temperature, e.g.,

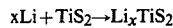

$$xLi + TiS_2 \rightarrow Li_xTiS_2$$

The load capacity of such cells is determined by the speed with which the Li atoms diffuse into the crystalline lattice of the TiS$_2$. This is inherently limited.

A solid electrolyte cell having a negative Li electrode which can also be discharged at room temperature is disclosed in German Patent Publication (Auslegeschrift) No. 23 49 615. The cathode material of this cell is formed by the sulfates of Pb, Sn, Cu, Hg, Ag, Ca or Li, which have additionally been doped with electron conductive materials. However, due to the composition of the overall electrochemical system, this cell is not conducive to high energy density.

German Pat. No. 22 54 870 discloses a galvanic element whose negative electrode and positive electrode consists of As or Sb, and which operates with a liquid organic electrolyte containing a conductive salt.

According, it is an object of the present invention to provide a galvanic cell with solid electrolyte, in which the electrochemical reaction on which the current delivery is based involves the highest possible coulomb yield, and in which especially the cathode yields a high energy density which is a function of volume.

This and other objects which will appear are achieved in accordance with the present invention by utilizing a positive electrode which consists, in the charged state, either individually or in mixture of metallic Sb, Bi or oxides and chalcogenides of these metals, and which consists in the discharged state of a reversible, intermetallic combination of Sb and/or Bi with the alkali metal of the negative electrode.

For further details, reference is made to the description which follows, in light of the accompanying drawing wherein the single FIGURE shows the performance characteristics of two embodiments of the present invention.

It is particularly desirable that the material of the positive electrode, in the charged state, consists of either metallic antimony or bismuth or of an oxide or chalcogenide of one of these metals, the latter being selected from the group of Sb$_2$O$_3$, Sb$_2$S$_3$, Bi$_2$O$_3$, Bi$_2$S$_3$. However, the material can also consist either of a mixture of the two metals or of a mixture of oxides and chalcogenides of the above-mentioned group.

As the negative electrode there may be used either a lithium or a sodium electrode. However, the solid electrolyte must be matched to it. For the former, Li$_3$N is suitable, for the latter, Na$_3$Zr$_2$Si$_2$PO$_{12}$ (Nasicon).

Surprisingly, it has been found that a solid electrolyte embodying the invention can be discharged at a potential of U=0.8 V using a positive metal electrode of Bi, for example. This voltage corresponds to the reaction

$$3Li + Bi = Li_3Bi \tag{1}$$

Based on the above-mentioned reaction, the volumetric capacity of the Bi amounts to 1333 mAh/cm$^3$.

However, it is particularly desirable to utilize as the cathode material in a solid cell embodying the invention not Sb or Bi but rather their oxides or chalcogenides. This is because, in that case, the metal is reduced during discharge from Me$^{3+}$ to Me$^{3-}$ in accordance with the reaction equation

$$12 Li + Bi_2O_3 = 2 Li_3Bi + 3 Li_2O \tag{2}$$

and this signifies a higher energy density. Consequently, there also results for Bi$_2$O$_3$ a higher volumetric capacity of 1543 mAh/cm$^3$ at the same cell potential of 0.8 V.

Another conceivable cell reaction, namely

$$6 Li + Bi_2O_3 = 2 Bi + 3 Li_2O, \tag{3}$$

occurs at a voltage of U=2.04 V in a cell which has an organic electrolyte, for example. Miltiple potentials of 0.8 V can be produced without difficulty by connecting in series solid electrolyte cells embodying the invention.

Not only for reasons of favorable energy density, but also from the standpoint of cost, the oxides $Sb_2O_3$ and $Bi_2O_3$ are of greater interest than any corresponding pure metals. On the other hand, the sulfide $Bi_2S_3$ has the advantage of a relatively high electron conductivity, so that it does not need conductive additives. On the other hand, for oxides, up to 30% by weight of graphite is included. In that case, the conductive material can also consist of finely divided Sb or Bi.

When using a metal cathode, it is desirable to add polytetrafluoroethylene as binder to the metal powder (Sb or Bi).

The manufacture of a solid electrolyte cell in accordance with the invention involves, as regards the cathode, pressing on, melting on, vapor depositing, or sputtering on of the positive material upon the solid electrolyte tablet. Using the same method, the negative electrode is applied to the opposite side of the solid electrolyte.

Referring to the drawing, this shows in Curve 1 a graph of the voltage variation of a solid electrolyte cell Li/Li$_3$N/Bi (powder mixture with 5% by weight PTFE, compressed at 7.5 kbar, about 1.3 cm$^2$ cathode surface) during discharge through a resistance of 32.8 k as a function of $Q/Q_{th}$, wherein Q=the capacity drained, $Q_{th}$=the theoretically available capacity. Curve 2 shows the voltage variation of a solid electrolyte cell Li/Li$_3$N/Bi$_2$O$_3$ (+30% by weight of C, about 1 cm$^2$ cathode surface) for discharge through a 15.5 k resistance.

We claim:

1. A galvanic cell with solid electrolyte, having a negative lithium or sodium electrode, a solid positive electrode and a solid electrolyte between the electrodes and dischargeable at room temperature, wherein
   the positive electrode consists, in the charged state, either individually or intermixed, of metallic Sb, Bi or oxides and chalcogenides of these metals, and
   in the discharged state, of a reversible intermetallic combination of the Sb or, Bi, or Sh and Bi with the alkali metal of the negative electrode, and
   the electrolyte is Li$_3$N when the negative electrode is a lithium electrode and is Na$_3$Zr$_2$Si$_2$PO$_{12}$ when the negative electrode is a sodium electrode.

2. The cell of claim 1 wherein the oxides and chalcogenides are selected from the group consisting of Sb$_2$O$_3$, Sb$_2$S$_3$, Bi$_2$O$_3$, Bi$_2$S$_3$.

3. The cell of claim 1 wherein the positive electrode electrode material also includes a binder of polytetrafluoroethylene and a conducting material.

4. The cell of claim 3 wherein the conducting material is graphite.

5. The cell of claim 1 wherein the negative electrode is a lithium electrode.

6. The cell of claim 1 wherein the negative electrode is a sodium electrode.

* * * * *